United States Patent [19]

Verge

[11] Patent Number: 5,419,477

[45] Date of Patent: May 30, 1995

[54] WATERPROOF RETRACTABLE TOWEL BAG

[75] Inventor: Ronald J. Verge, Windsor Junction, Canada

[73] Assignee: Pamela M. Verge, Windsor Junction, Canada

[21] Appl. No.: 143,823

[22] Filed: Oct. 27, 1993

[30] Foreign Application Priority Data

Oct. 6, 1993 [CA] Canada .................................... 2108046

[51] Int. Cl.⁶ .......................... B65D 65/02; B60R 9/00
[52] U.S. Cl. ...................................... 224/274; 224/191; 224/242; 15/208; 150/154
[58] Field of Search ..................... 224/918, 274, 42.46, 224/269, 191, 226, 245, 246, 252, 254, 242; 206/315.1, 493, 38.1, 361, 37; 150/154, 159, 160; 132/312, 317; 15/208, 214, 209.1, 113; 24/115 G

[56] References Cited

U.S. PATENT DOCUMENTS

| | | | |
|---|---|---|---|
| 2,204,947 | 6/1940 | Apfelbaum | 15/208 |
| 2,233,157 | 2/1941 | Cahn et al. | 206/361 |
| 3,350,736 | 11/1967 | Frazelle et al. | 15/113 |
| 4,004,315 | 1/1977 | Rials | 15/209 R |
| 4,232,808 | 11/1980 | Gray | 383/4 |
| 4,453,292 | 6/1984 | Bakker | 24/115 G |
| 4,516,616 | 5/1985 | Fesler | 150/52 R |
| 4,675,948 | 6/1987 | Bengtsson | 24/115 G |
| 4,854,449 | 8/1989 | Fitzhugh | 206/38.1 |
| 4,953,603 | 9/1990 | Holden | 150/154 |
| 5,009,327 | 4/1991 | Levison | 206/361 |
| 5,092,013 | 3/1992 | Genovese, Jr. | 15/209.1 |
| 5,099,897 | 3/1992 | Curtin | 150/159 |
| 5,131,112 | 7/1992 | Cervini | 15/209.1 |
| 5,161,683 | 10/1992 | Smith | 206/315.1 |

FOREIGN PATENT DOCUMENTS

| | | | |
|---|---|---|---|
| 2016415 | 11/1991 | Canada. | |
| 964395 | 5/1957 | Germany | 383/24 |

Primary Examiner—Henry J. Recla
Assistant Examiner—Gregory M. Vidovich
Attorney, Agent, or Firm—Robert M. Phipps

[57] ABSTRACT

A towel protector includes a waterproof inverted bag provided with a suspension grommet for suspending the bag from a golf cart or the like. Another grommet in the wall of the bag allows passage of a towel suspension cord. The exterior part of the cord is provided with a spring loaded toggle abutting against the grommet. The pressing of a release button of the toggle allows free passage of the cord through the toggle and into the bag. The opening at a lower end of the bag is large enough to allow free movement of towels suspended at the end of the cord out of and back into the bag, as the toggle and the cord are manipulated by the user. The device presents an advantage over known towel protectors in that it is extremely simple in structure and convenient in use as the user does not have to reach into the protective bag to pull the towels out or otherwise manipulate the protecting cover. The towel protector is primarily intended for use as a golf towel protecting device.

3 Claims, 2 Drawing Sheets

WATERPROOF RETRACTABLE TOWEL BAG

The present invention relates primarily, but not exclusively, to a waterproof golf towel bag.

Various embodiments of towel or other wiping cloth protecting devices are described in prior art. From the standpoint of the present invention, they are either too complex in structure or cumbersome in use requiring the user to reach into a protective bag or to somehow manipulate the protective bag to obtain access to the towels. The following prior art is illustrative of the state of prior art referred to above: U.S. Pat. No. 2,204,947 (Apfelbaum); U.S. Pat. No. 2,233,157 (Cahn et al.); U.S. Pat. No. 3,350,736 (Frazelle et al.); U.S. Pat. No. 4,516,616 (Fesler); U.S. Pat. No. 4,953,603 (Holden); U.S. Pat. No. 5,099,897 (Curtin); U.S. Pat. No. 5,131,112 (Cervini).

It is an object of the present invention to provide a towel protecting cover particularly, but not exclusively, useful as a golf towel protector which would present an improvement over the above prior art in a simple structure and convenient use.

In general terms, the invention provides a towel protecting device comprising, in combination:
  (a) a container portion made of a water resistant material;
  (b) said container portion having the general shape of an inverted container including an enclosed upper portion and an open lower end portion;
  (c) said upper portion including container suspension means facilitating the hanging of the container portion to suspend same at a predetermined location;
  (d) said upper portion further including passage means in a wall of the container portion, the passage means communicating the interior of the container portion with the exterior thereof;
  (e) a cord adapted to be freely slidable in and to pass through said passage means to thus provide a first section of the cord disposed, in use, exteriorly of the container portion, and a second section of the cord disposed, in use, interiorly of the container portion;
  (f) towel securement means at a free end portion of said second section and adapted to secure said free end portion to a towel or towels;
  (g) cord blocking means disposed, in use, at said passage and selectively engageable with the first section of the cord to block free sliding movement of the cord through said passage into the container portion in at least two blocked positions wherein a respective towel or towels are located inside or outside the container portion, respectively.

The invention is now described by way of a preferred embodiment, with reference to the accompanying simplified, diagrammatic drawings. In the drawings.

Figure 1:
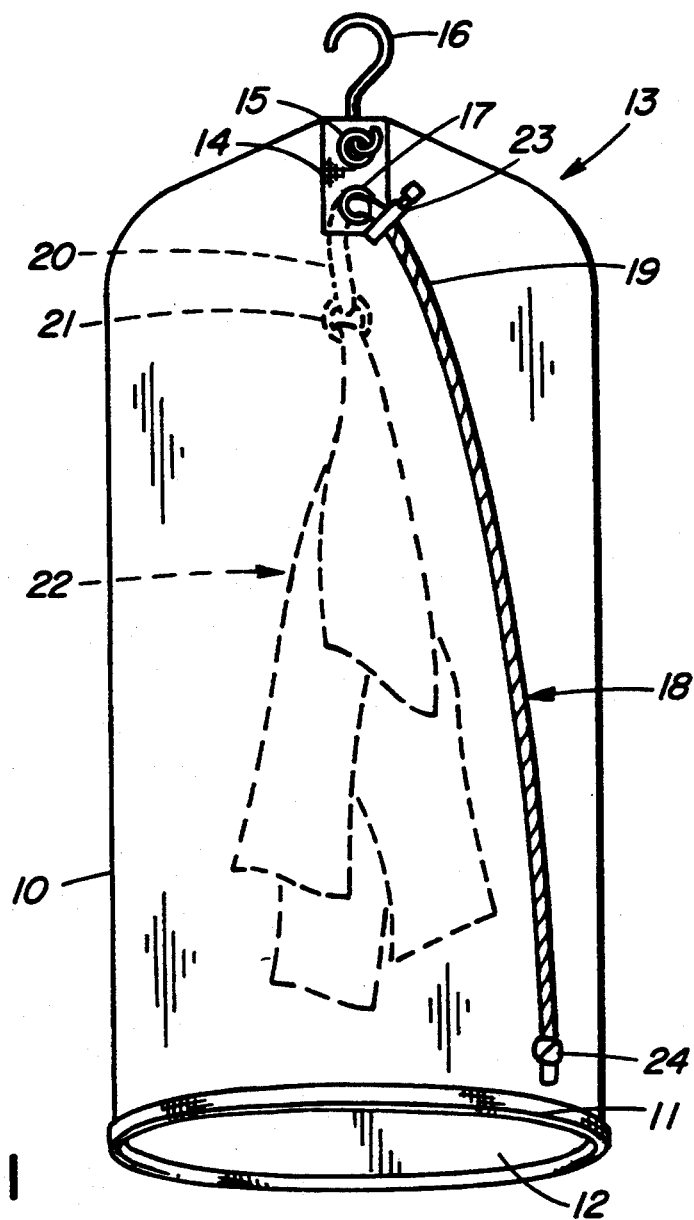
FIG. 1 is a simplified side view of a golf towel protecting device made in accordance with the present invention, showing the towels in a protected position inside the cover bag.

Reference number 10 designates a container portion or bag made from waterproof textile material such as nylon fabric. It may be provided with a lining (not shown in the drawings). The bag is provided with an exteriorly placed webbing 11 folded in half and sewn onto the bag 10 around its opening 12 at the lower end thereof, the upper end 13 being closed to provide protection for the contents of the bag 10. The purpose of the webbing 11 is to maintain the bag in its shape as shown, with the opening 12 being unrestrained and ready to allow free movement of the contents out and in the bag 10, as will be described. The bag of the embodiment described is about 22" high and about 9" wide, it being understood that the dimensions are purely optional depending on application of the invention.

The upper end 13 of the bag 10 is provided with a reinforcement webbing 14 straddling the top end 13 of the bag 10. An upper grommet 15 extends through both layers of the reinforcement webbing at opposed sides of the bag 10, to provide a passage for a suspension hook 16. The hook 16 secures the bag 10 to a golf cart or the like, with the opening 12 facing down, when the device is in use.

Figure 2:
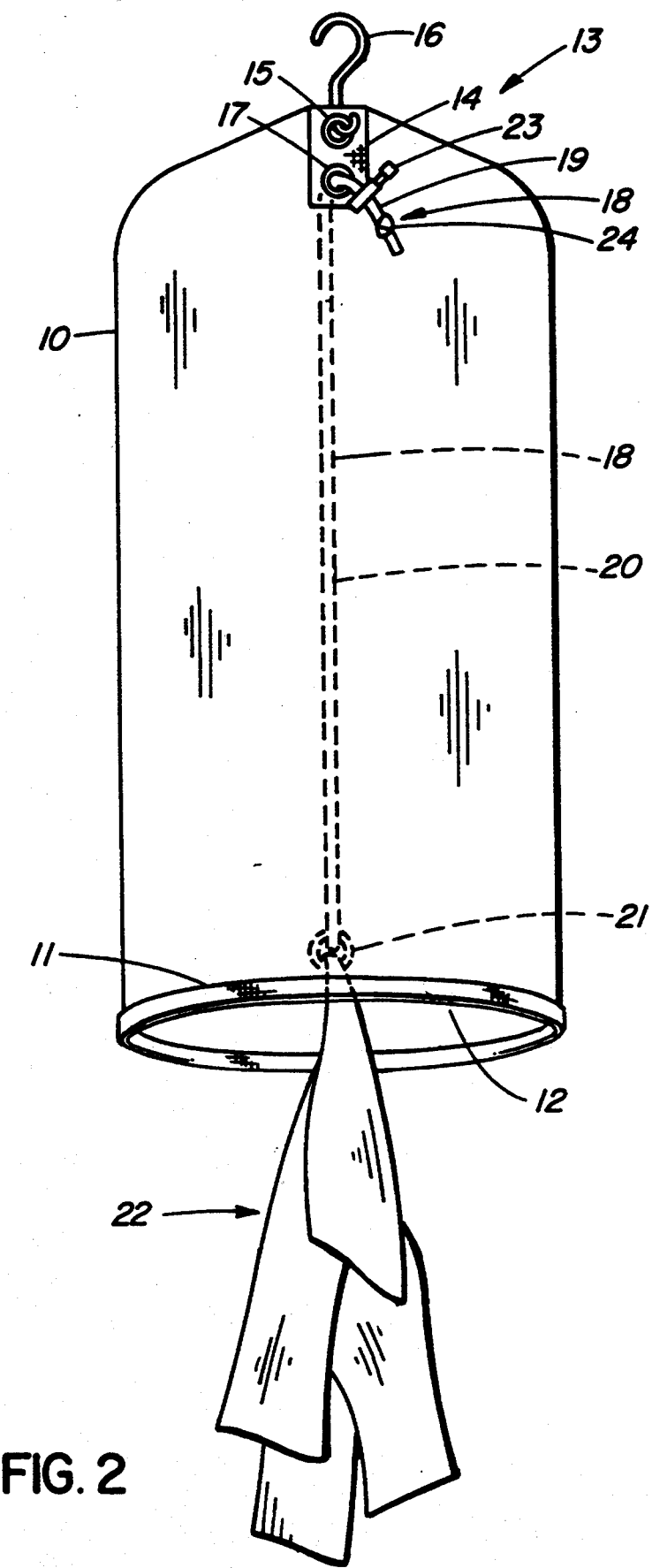
FIG. 2 is a view similar to that of FIG. 1 but showing the towels outside the bag or container portion.

The side wall of the bag 10 facing the viewer of FIG. 1 or 2 is provided with a lower grommet 17. It passes through the visible part of the reinforcement 14 and through the adjacent wall of the bag. The lower grommet 17 provides a passage communicating the interior of the bag 10 with the exterior thereof. It has one end inside the bag 10 and the other outside, as opposed to the upper grommet 15 where both axial ends of the grommet are outside the bag.

Threaded through the lower grommet is a flexible cord 18. The lower grommet (generally referred to as "passage means") allows for a resistance free sliding of the cord 18 into or out of the bag 10. For convenience, the cord 18 is shown as having a first or exterior section 19 and a second or interior section 20 disposed inside the bag 10. The length of both sections is selectively variable by pulling the first section 19 out of the grommet 17 or allowing it to slide into the bag 10.

The lower, free end portion of the second section 20 of the cord 18 is provided with a securement ring 21 which serves the purpose of securing to the cord 18 a bundle of towels 22. The size of the bag 10 is so designed that it loosely accommodates the bundle 22 for a resistance free movement of the bundle 22 in and out of the bag 10, through the opening 12.

The second, exterior section 19 of the cord 18 is threaded through a cord toggle 23 and has an end knot 24 to prevent inadvertent removal of the toggle 23.

As is well known from the art of cord toggles, the purpose of same is to provide a selectively displaceable, relatively bulky body for abutment against a wall at a small passage such as the grommet 17. The structure of a toggle allows ready adjustment of the body of the toggle 23 along the cord 18 and instant blocking of further motion. The toggle 23 itself is thus in effect an abutment element co-operating with the lower grommet 17.

Figure 3:
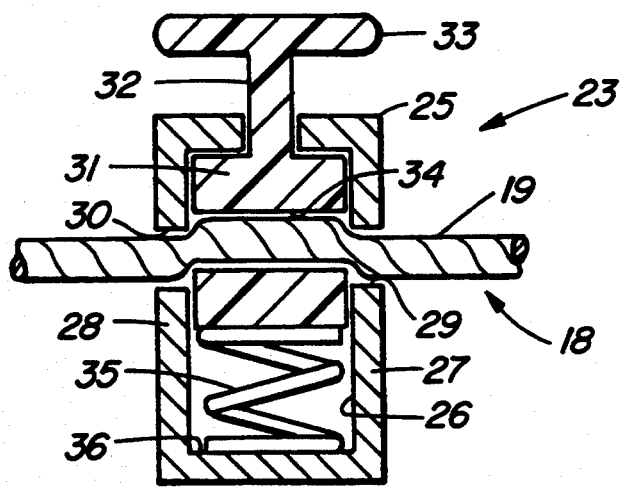
FIG. 3 is a diagrammatic representation, on enlarged scale, of the function of a cord toggle (known per se) which presents a preferred embodiment of a device for alternatively blocking or allowing the sliding of the towel suspending cord out of the hanging bag or container portion.

For the sake of better understanding, an exemplary structure of the cord toggle 23 is diagrammatically indicated in FIG. 3. It includes a hollow body 25 which defines a cavity 26 of rectangular cross-section. The front and rear walls 27, 28 define a front passage 29 and a coaxial rear passage 30. The size of the coaxial passages 29, 30 allows free sliding of the cord 18 through the body 25 of the toggle 23.

Disposed in the cavity 26 for a free sliding movement up and down as viewed in FIG. 3, is a locking block 31 integral with one end of a stem 32. The other, top end of the stem 32, in turn, is integral with a push button 33. A bore 34 in the block 31 has generally the same size and orientation as the passages 29, 30, to allow a free sliding of the cord 18 therethrough when the bore 34 and the passages 29, 30 are aligned. However, they are normally offset due to the pressure exerted by a compression spring 35 disposed between the block 31 and the bottom 36 of the cavity 26, thus squeezing the cord 18 as shown, to block the sliding of the cord 18 through the toggle. It will thus be appreciated that, on abutment of the toggle 23 against the lower grommet 17, the cord 18 can no longer freely slide through the passage provided by the grommet 17. The free sliding of the toggle 23 relative to the cord 18 is only possible when the push button 33 is depressed resulting in alignment of the passages 29, 30 with the bore 34. Many other, different types of cord toggles are commercially available.

The operation of the inventive cover is very simple. Starting at the position shown in FIG. 1, the toggle 23, locked to the cord 18, abuts against the outer face of the grommet 17, with the towel bundle 22 suspended inside the bag or container portion 10. The towels are now unexposed and fully protected. If it is desired to expose the towels for use, the toggle 23 is manipulated by pressing the push button 33, releasing the movement of the cord 18 through the toggle 23 and grommet 17 into the bag 10. The weight of the towel bundle 22 itself is sufficient to cause such movement. Combined with the loose position of the bundle 22 inside the bag 10, the release of toggle 23 will result in the bundle 22 freely passing through the opening 12. After use, the toggle 23 is depressed again, held at the grommet 17, and a pull on the first section 19 of the cord 18 results in the bundle 22 being raised again back into the bag 22, without the need for contacting or manipulating the bag 10 or the bundle 22 other than described.

Those skilled in the art will appreciate that many variations of the protecting device according to the present invention can be made without departing from the scope of the present invention. Strictly as a few of many possibilities, the toggle 23, while preferred, could be substituted by some other mechanism, e.g. a keyhole shaped passage instead of the grommet 17 combined with some bulky projections (e.g. knots) on the first section 19 could function in a similar fashion to lock the cord 18 in place. The bag 10 could be replaced by some other container or envelope made from plastic or some other material. The suspension of the bag 10 could be accomplished by many means other than the described grommet 15 and hook 16. The device can be sold in a fully assembled state, inclusive of the towels, or entirely disassembled, where even the cord 18 and the toggle 23 would be included as separate items to be combined together and with the bag 10 by the user.

Accordingly, I wish to protect by Letters Patent which may issue on this application all such embodiments as fairly fall within the scope of my contribution to the art.

I claim:

1. A golf towel means protecting device comprising, in combination
   (a) a container portion having walls made of a flaccid flexible water resistant sheet material;
   (b) said container portion having the shape of an inverted bag including an enclosed upper portion and an opening at a lower end portion thereof;
   (c) said upper portion including container portion suspension means for facilitating hanging of the container portion to suspend same at a predetermined location;
   (d) said upper portion further including passage means in a wall of the container portion, the passage means communicating the interior of the container portion with the exterior thereof;
   (e) a cord having opposite ends, said cord passing through said passage means and adapted to slide therethrough to the interior of said container portion, one of said opposite ends of said cord being located inside said container portion and adapted to be connected to a towel means, said container portion defining an interior chamber large enough to provide space between said walls and said towel means whereby said cord will slide through the grommet by the weight of the towel means when the container portion is suspended on said container portion suspension means, to thus provide a first section of the cord disposed exteriorly of the container portion, and a second section of the cord disposed interiorly of the container portion;
   (f) section of the cord to block sliding movement of the cord through said passage means into the container portion in at least two blocked positions wherein the towel means is disposed inside or out of the container portion, respectively;
   (g) said container portion having a length sufficient to entirely cover the towel means when the cord is in a fully retracted position in which the length of said second section of the cord is at its minimum;
   (h) whereby the withdrawal of the towel means from the container portion and its placement back into the suspended container portion can be achieved solely by simultaneous manipulating said first section of the cord and said cord blocking means.

2. A golf towel means protecting device comprising, in combination
   (a) a container portion having walls made of a flaccid flexible water resistant sheet material;
   (b) said container portion having the shape of an inverted bag including an enclosed upper portion and an opening at a lower end portion thereof;
   (c) said upper portion including container portion suspension means for facilitating hanging of the bag to suspend same at a predetermined location;
   (d) said upper portion further including a grommet in a wall of the container portion, the grommet communicating the interior of the container portion with the exterior thereof;
   (e) a cord having opposite ends, said cord adapted to pass through said grommet and adapted to slide therethrough to the interior of said container portion, one of said opposite ends of said cord being located inside said container portion and adapted to be connected to a towel means, said container portion defining an interior chamber large enough to provide space between said walls and said towel means whereby said cord will slide through the grommet by the weight of the towel means when the container portion is suspended on said bag suspension means, to thus provide a first section of the cord disposed exteriorly of the container portion, and a second section of the cord disposed interiorly of the container portion;

(f) a cord stopping toggle comprising a body adapted to abut against an outer face of said grommet and selectively engageable with the first section of the cord to block sliding movement of the cord through said grommet into the container portion in an infinite number of blocked positions at which positions the towel means is disposed inside or out of the container portion, or at an intermediate position partly in an partly out of the container portion dependent on the location of the toggle with respect to said first section;

(g) said body defining a passage for sliding of said first section of the cord therethrough, spring loaded blocking means constricting the passage to block the sliding of said first section therethrough, and manually operable release means for temporarily releasing the blocking means to allow the sliding of the cord through the grommet and thus movement of the towel;

(h) said container portion having a length sufficient to entirely cover the towel means when the cord is in a fully retracted position in which the length of said second section of the cord is at its minimum;

(i) whereby the withdrawal of the towel means from the container portion and its placement back into the suspended container portion can be achieved solely by simultaneous manipulating said first section of the cord and said toggle.

3. A golf towel means protecting device comprising, in combination (a) a container portion having walls made of a flaccid flexible water resistant sheet material;

(b) said container portion having the shape of an inverted bag including an enclosed upper portion and an opening at a lower end portion thereof;

(c) said upper portion including container portion suspension means for facilitating hanging of the container portion to suspend same at a predetermined location;

(d) said upper portion further including passage means in a wall of the container portion, the passage means communicating the interior of the container portion with the exterior thereof;

(e) a cord having opposite ends, said cord adapted to pass through said passage means and adapted to slide therethrough to the interior of said container portion, one of said opposite ends of said cord being located inside said container portion and adapted to be connected to a towel means, said container portion defining an interior chamber large enough to provide space between said walls and said towel means whereby said cord will slide through the passage means by the weight of the towel means when the container portion is suspended on said container portion suspension means to thus provide a first section of the cord disposed exteriorly of the container portion, and a second section of the cord disposed interiorly of the container portion;

(f) cord blocking means disposed at said passage means and selectively engageable with the first section of the cord to block sliding movement of the cord through said passage means into the container portion in at least two blocked positions wherein the towel means is disposed inside or out of the container portion, respectively;

(g) said container portion having a length sufficient to entirely cover the towel means when the cord is in a fully retracted position in which the length of said second section of the cord is at its minimum;

(h) whereby the withdrawal of the towel means from the container portion and its placement back into the suspended container portion can be achieved solely by simultaneous manipulating said first Section of the cord and said cord blocking means; and (i) a reinforcement webbing around the opening at the lower end portion of the container portion to maintain the opening in a generally circular, fully open state to facilitate passage of the towel means therethrough.

* * * * *